United States Patent [19]
Kislovski

[11] Patent Number: 5,045,771
[45] Date of Patent: Sep. 3, 1991

[54] METHOD AND CIRCUIT FOR PREVENTING TRANSIENTS FROM DAMAGING A SWITCHING REGULATOR

[75] Inventor: Andre Kislovski, Neuenegg, Switzerland

[73] Assignee: Ascom Hasler AG, Bern, Switzerland

[21] Appl. No.: 362,452

[22] PCT Filed: Oct. 12, 1988

[86] PCT No.: PCT/CH88/00188
§ 371 Date: Apr. 21, 1989
§ 102(e) Date: Jul. 10, 1989

[87] PCT Pub. No.: WO89/03608
PCT Pub. Date: Apr. 20, 1989

[30] Foreign Application Priority Data
Oct. 15, 1987 [CH] Switzerland ............ 04033/87

[51] Int. Cl.⁵ ............................................ G05F 1/575
[52] U.S. Cl. ................................. 323/282; 323/285; 323/351
[58] Field of Search ............ 323/282, 284, 285, 286, 323/287, 351

[56] References Cited
U.S. PATENT DOCUMENTS

| | | | |
|---|---|---|---|
| 3,585,491 | 6/1971 | Peterson | 323/286 |
| 3,733,540 | 5/1973 | Hawkins | 323/22 T |
| 3,736,469 | 5/1973 | Baugher et al. | 323/285 |
| 4,712,169 | 12/1987 | Albach | 323/282 |
| 4,719,552 | 1/1988 | Albach et al. | 323/282 |

Primary Examiner—Steven L. Stephan
Assistant Examiner—Jeffrey Sterrett
Attorney, Agent, or Firm—McAulay, Fisher, Nissen, Goldberg & Kiel

[57] ABSTRACT

A voltage control regulator features a power switch in the form of a transistor that is normally actuated for a constant switch-on time interval during each variable period interval (T). The type of control required in this case comprises, conventionally, a monostable multivibrator, a controller, and a voltage/frequency converter. The present control system is subordinated to an emergency control circuit which, via a priority loop, intervenes in the control process as soon as the current flowing through the switching transistor threatens to become excessive. This emergency control unit thus constitutes a predictive type of control that employs knowledge of the operation of the voltage control regulator and the instantaneous values of the input and output voltages of the voltage control regulator, in order to predict the voltage increase during the period interval (T). Such an arrangement permits the emergency control unit to react very quickly.

7 Claims, 4 Drawing Sheets

METHOD AND CIRCUIT FOR PREVENTING TRANSIENTS FROM DAMAGING A SWITCHING REGULATOR

FIELD OF INVENTION

The present invention relates to a method and device suitable for preventing transients from hampering the operation of a switching regulator (buck cell).

BACKGROUND OF INVENTION

Switching regulators based on the principle of the buck cell are known, for example, from Patent WO 84/00085 or EP/O 111 493. Such switching regulators have a power switch that opens and closes according to a predetermined pattern, whereby energy is periodically fed to a choke and through the latter both to a capacitor and a load switched in parallel thereto.

The principle of the switching regulator is very simple and its construction is sturdy. The switching regulator can, however, be damaged under extreme operating conditions, especially its power switch can be damaged. Such conditions occur primarily in the event of short-circuits at the output and during turning the regulator on. In general, the conventional switching regulator reacts too slowly and is not able to handle rapid changes, that is, so-called transients.

SUMMARY OF THE INVENTION

An object of the present invention is to provide a simple and effective method by which the conventional switching regulator can be safeguarded against the above-described extreme operating conditions and thus protect against damage or even destruction during operation.

The proposed solution is characterized by the optimal functioning of the switching regulator under all operating conditions. Deleterious short switching intervals are completely eliminated. In addition, the excessive currents caused by transients, as well as long-lasting perturbations, are prevented from occurring.

There is more particularly provided in accordance with the present invention a method for preventing transients from damaging a switching regulator, which includes at least a switch, a recovery diode, a choke, a capacitor, comprising the steps of providing a switch control that actuates the switch throughout a continuous series of period intervals (T) of variable length for a time period (t) in each of such period intervals that is virtually constant, and determining prior to the beginning of each switch-on interval (t) whether or not the current flowing through the choke will surpass a predetermined maximum value ($i_{max}$), and, in the event of such excess, holding the switch open until, at the end of the finally initiated switch-on interval (t), maximum current ($i_{max}$) is reached but not exceeded.

Further, in accordance with the present invention, a circuit arrangement is provided for preventing transients from damaging a switching regulator which includes at least a switch, a recovery diode, a choke, a capacitor and a switch control for the switch, wherein the switch control includes a monostable multivibrator whose switch-on interval (t) is inversely proportional to an input voltage (e), and a voltage/frequency converter suitable for sending switch-on signals to the multivibrator. The switch control also includes a priority loop suitable for releasing the greater of any one of two given voltages ($u_1$, $u_2$) to said voltage/frequency converter, a controller capable of generating one of the input voltages to the priority loop by comparing prevalent actual voltage ($U_{ist}$) to a reference voltage ($U_{soll}$), and an emergency control unit suitable for generating the other of the input voltage ($u_1$) to the priority loop.

For a better understanding of the present invention, reference is made to the following description and accompanying drawings while the scope of the invention will be pointed out in the appended claims.

BRIEF DESCRIPTION OF THE DRAWINGS

The invention is illustrated by way of example in the accompanying drawings wherein.

DESCRIPTION OF THE PREFERRED EMBODIMENTS

Figure 1:
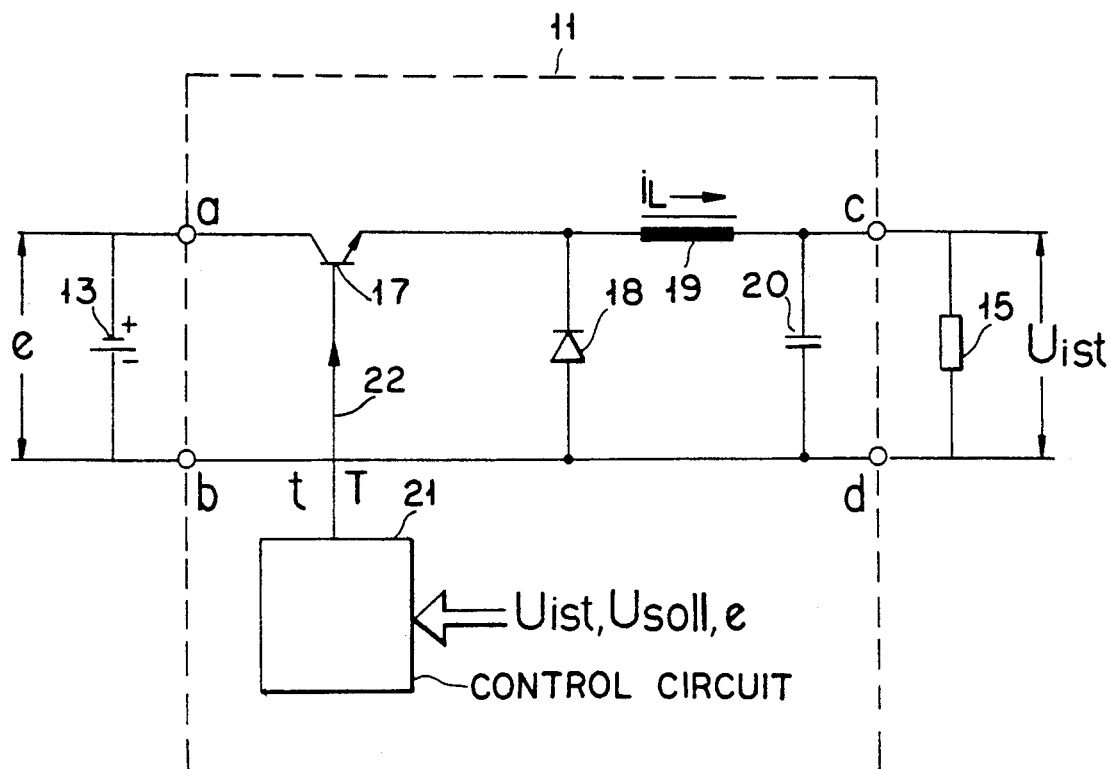
FIG. 1 is a schematic circuit diagram of a buck-type regulator.

FIG. 1 shows the circuitry of a prior art switching regulator 11 or buck cell, e.g., as known from the above-mentioned reference WO 84/00085. Switching regulator 11 includes a power switch 17, embodied as a switching transistor, a free-wheeling diode 18, a choke or inductor 19; a capacitor 20; and a control circuit 21.

Switching regulator 11 connects by way of its input terminals a, b to a voltage source 13 which supplies an input voltage e, which although being d.c., can fluctuate rapidly and sharply. Connected to output terminals c, d of switching regulator 11 is a load 15 represented by a resistance in ohms, beside which is shown the actual output voltage $U_{ist}$.

Control circuit 21 delivers, through output 22, switching signals to the switch 17, which closes for a switch-on time interval (conduction interval) t during switching time interval T, and then opens during the remainder of the switching time T. Control circuit unit 21 receives as control variables primarily the actual voltage $U_{ist}$, a variable reference voltage $U_{soll}$ and the input voltage e. Depending on the input voltage e, the switch-on time intervals are adjusted until the product of t·e remains constant. Independently of this relationship, period intervals T are adjusted until $U_{ist}$ becomes equal to $U_{soll}$. Practical values of t and T are respectively 10 to 20 μs and 50 to 300 μs.

Figure 2:
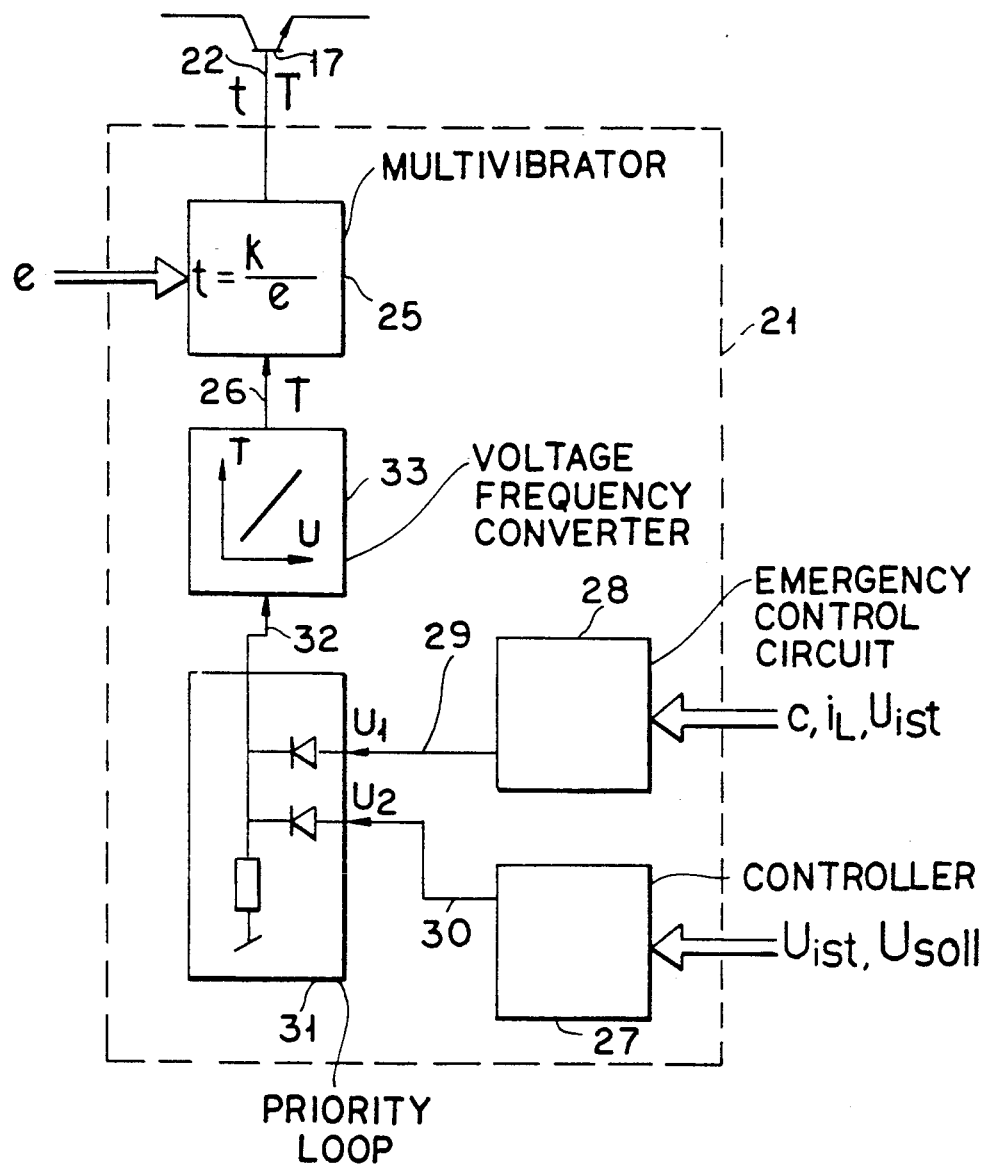
FIG. 2 is a schematic circuit diagram of a control circuit unit.

FIG. 2 is a detailed circuit diagram of control circuit unit 21, which sends, as described above, switch-on interval signals t and period interval signals T to switch 17. Unit 21 comprises a monostable multivibrator 25, an error amplifier or controller 27, an emergency control unit 28, a priority circuit 31 and a voltage/frequency converter 33.

Input voltage e is fed as a control variable to monostable multivibrator 25. Whenever a trigger signal arrives at input 26, monostable multivibrator 25 is activated. After a time interval where t=k/e, (where k is a constant) multivibrator 25 reverts to its resting state. This sequence ensures that the product of e·t remains constant, a condition that is advantageous for the overall prior art control process. A multivibrator of the above-mentioned type is also known, e.g., from the above-mentioned reference WO 084/00085. Controller, i.e., error amplifier 27, can, for example, be embodied as a differential amplifier, to which actual and reference voltages $U_{ist}$ and $U_{soll}$ are fed, while voltage/frequency converter 33 can be embodied as a commercially available VCO (voltage controlled oscillator).

Units 27, 33 and 25 constitute a conventional and known control circuit that serves to compare and control output voltage $U_{ist}$ with respect to reference value $U_{soll}$, deviations between these two values are used by the voltage/frequency converter 33 to modify the length of period interval T. Switch-on interval t meanwhile remains constant, and is influenced only by the input voltage e that changes only slightly in a given period interval T.

It is proposed that an emergency control circuit 28 operate in conjunction with this known control circuit. Priority circuit 31, which, conventionally, comprises two diodes and a resistor, releases via its output 32 the greater of two voltages $u_1$ and $u_2$ which might arrive at its inputs 29 and 30. Voltage $u_2$, arriving at the output of controller 27 is, as a rule, greater than $u_1$, a condition underlying the operation of such control circuit. Should, however, voltage $U_{ist}$ be significantly smaller than $U_{soll}$, which always occurs for a short interval when output voltage regulator 11 is switched on or for a longer period during a short-circuit at output terminals c, d, then voltage $u_1$ has priority at the output of emergency control unit 28, and governs the remaining process. Emergency control unit 28 hence prevents the control circuit from operating under unfavourable conditions for its power switch. Fed through inductor or choke 19 to emergency circuit 28 as control variables are input voltage e, output voltage $U_{ist}$ and current $i_L$.

Figure 3:
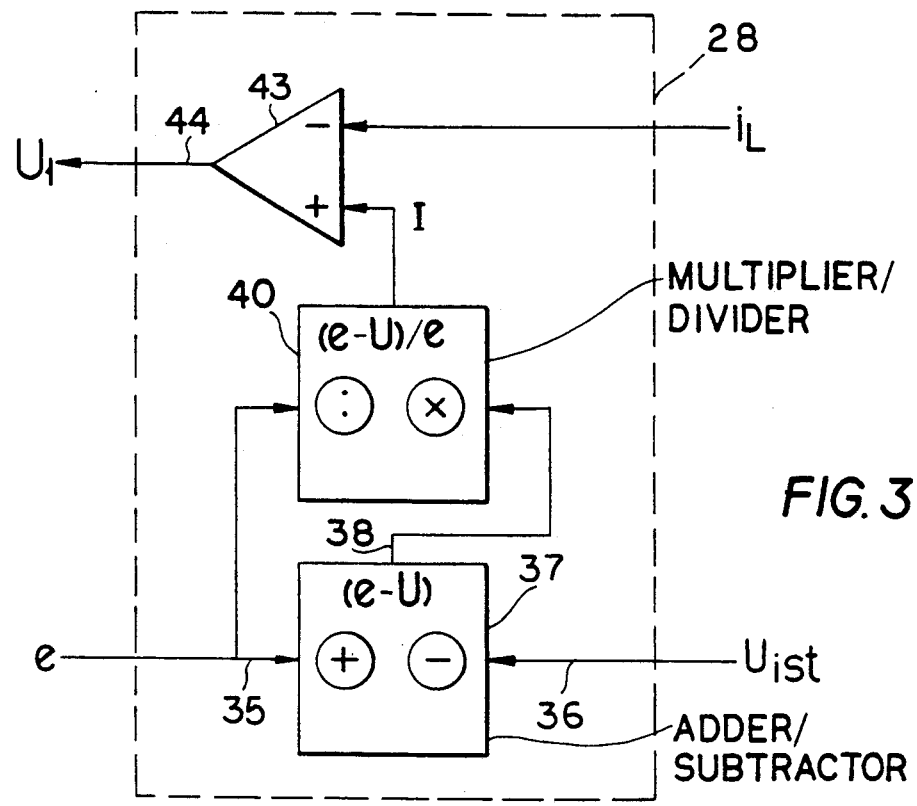
FIG. 3 is a schematic circuit diagram of an emergency control unit.

FIG. 3 shows a further-refined circuitry arrangement of emergency control circuit 28, which comprises an adder/subtractor 37, a multiplier/divider 40 and a comparator 43. Adder/subtractor 37 is, for example, embodied as a differential amplifier. Input voltage e is fed to control circuit 28 via input 35 while output voltage $U_{ist}$ is fed via the other input 36. Arriving at output 38 is a signal corresponding to the difference (e−U) between the above-mentioned voltages. Issuing from multiplier/divider 40, which can, for example, be a commercially available component MPY 100 supplied by the Burr-Brown company, is a signal I that is proportional to (e−U)/e and corresponds to a current.

Finally, in comparator 43, signal I is compared with the prevailing current $i_L$ passing through choke 19. Comparator 43, embodied for example as a differential amplifier, releases via output 44 voltage $u_2$ if $i_L$ is greater than I.

In the embodiment described, analog emergency control unit 28 continually extends, by means of its output signal $u_1$, the duration of period interval T so as to ensure that, during the next switch-on interval, the intensity of current $i_L$ flowing through choke 19, cannot surpass a preset value. As soon as it is established that this predetermined value will not be exceeded, emergency control unit 28 yields its governing function and control of output voltage $U_{ist}$ to the above-mentioned control circuit (Units 27, 33, 35). Emergency control unit therefore remains in continuous operation and reacts very rapidly each time the above-mentioned predetermined value is reached.

Figure 4A:
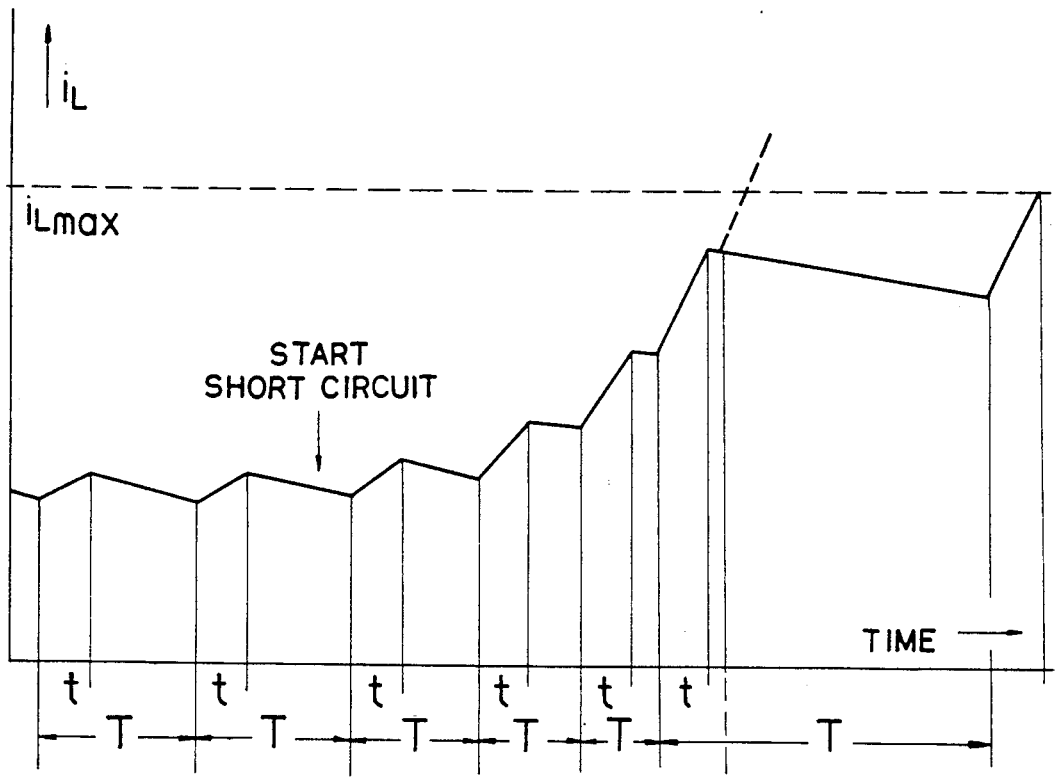
FIG. 4A is a waveform of the current in the choke following a short circuit.
Figure 4B:
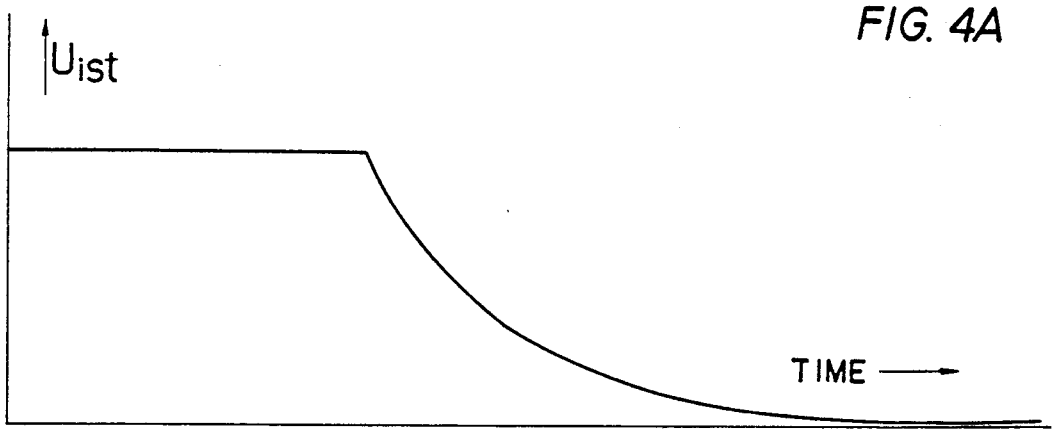
FIG. 4B is a waveform of the output voltage of the regulator following a short circuit.

FIG. 4a illustrates the waveform of current across choke 19, whereas FIG. 4b is a diagram of output voltage $U_{ist}$. The x axis is time, while the y axis is the current, or voltage, respectively. In every period interval T, switch 17 closes for an interval that is almost as long as the next. During the remainder of each period interval T, switch 17 is closed.

While current $i_L$ increases, during switch-on interval t, choke 19 is loaded with energy. During the remainder of the period, choke 19 is partially discharged and current $i_L$ subsides. If the voltage $U_{ist}$ at load 15 remains constant, it is reasonable to assume that the length of period intervals T will not fluctuate. Should, at this point, a sudden short-circuit occur at load 15, output voltage $U_{ist}$ falls rapidly towards zero. The control circuit (Units 27, 33, 25) is thus able to shorten the duration of period interval T while current $i_L$ rises rapidly and steeply in small increments. Before the permitted maximum current $i_{max}$ is exceeded during a given switch-on interval t, the emergency control unit intervenes at the end of the preceding period interval T and extends this interval T such that at the end of the next provisionally delayed switch-on interval t, the maximum current $i_{max}$ is reached but not exceeded. The lengths of the subsequent period intervals are then adjusted in such a way that at the end of each switch-on interval t, the maximum current $i_{max}$ is reached, but not exceeded. Emergency control circuit 28 thus constitutes a type of predictive control that "predicts" in each period interval T the size of the maximum current $i_L$ to occur in the following interval T. Should the predicted current strength be excessive, emergency control unit 28 intervenes to prevent the maximum allowable current from being surpassed.

Figure 5:
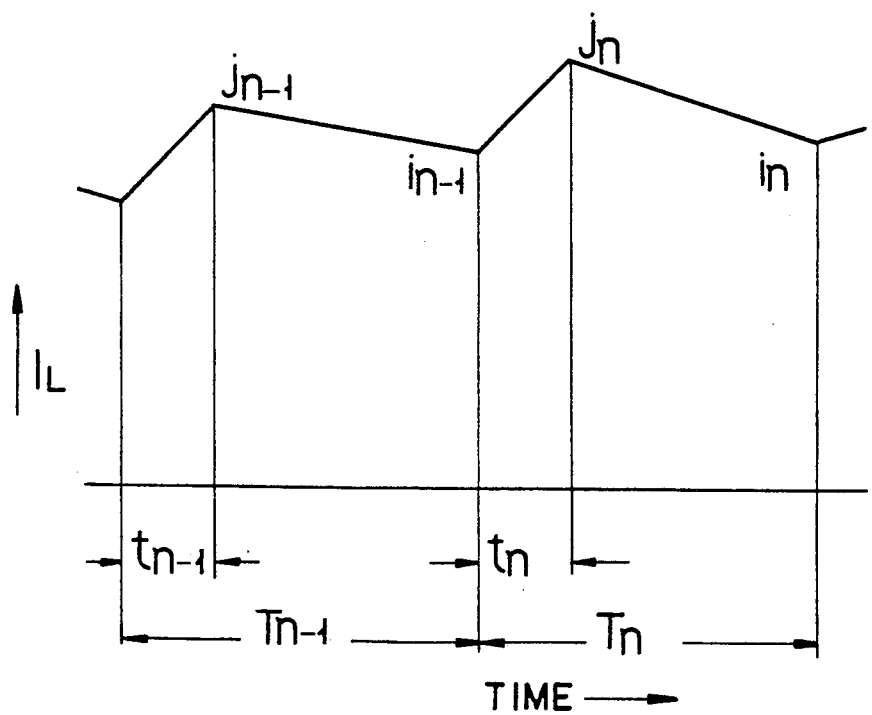
FIG. 5 is a second waveform showing the steady state choke current.

The behavior and construction of emergency control unit 28 are described in further detail in FIG. 5 which is a further waveform corresponding to that of FIG. 4a. Along the x-axis are arranged in series two period intervals $T_{n-1}$ and $T_n$ and their respective switch-on intervals $t_{n-1}$ and $t_n$. Along the y-axis are maximum currents $j_{n-1}$ and $j_n$ at the ends of their respective switch-on intervals $t_{n-1}$, $t_n$ and the minimum currents $i_{n-1}$ and $i_n$ at the ends of their respective period intervals $T_{n-1}$, $T_n$, or, rather at the beginning of each of the following period intervals $T_n$, $T_{n+i}$. The current fluctuates during the switch-off interval $(T-t)_{n-1}$ occurring between $j_{n-1}$ and $i_{n-1}$ and during the switch-on interval $t_n$ between $i_{n-1}$ and $j_n$.

Due to the shortness of the intervals in the timeframe under consideration input voltage e and output voltage U are to be regarded as constants. Concerning the multivibrator 25, the product t·e is constant. It is required that $j_n$ not exceed a predetermined maximum current $j_{max}$, i.e. $j_n \leq j_{max}$.

We can conclude from FIG. 5 that $$j_n = j_{n-1} - (j_{n-1} - i_{n-1}) + (j_n - i_{n-1}). \tag{1}$$

By applying the Law of mathematic Induction, $$j_n = i_{n-1} + \frac{e-u}{L} \cdot t_n \ (L = \text{inductivity of the choke 19}) \tag{2}$$

Since t·e = φ (φ = const), the expression is transformed into $$i_{n-1} = j_n - \frac{e-u}{e} \cdot \frac{\phi}{L} \qquad (3)$$

This expression is realized by the circuit shown in FIG. 3 and indicates that, given the minimum current value $i_{n-1}$ of period interval $T_{n-1}$ and the knowledge of the Law of Induction, it can be predicted whether or not, during the subsequent period interval $T_n$, the maximum allowed current will be exceeded. If it is decided that this value will be exceeded, period interval $T_{n-1}$ is extended until $$j_n = \frac{e-u}{e} \cdot \frac{\phi}{L}.$$

This ensures that maximum current $i_{Lmax}$ is virtually reached at the end of the next switch-on interval, as FIG. 4 shows.

If input voltage e is considered to be constant at its maximum value $e_{max}$, then expression (3) can be reduced to:

$$i_{n-1} = j_n - \frac{\phi}{L} + \frac{U}{e_{max}} \cdot \frac{\phi}{L} \qquad (4)$$

The above expression indicates the maximum value permitted for $j_{n-1}$, in order to ensure that current $j_n$ does not exceed the maximum allowed current $i_{max}$.

Figure 6:
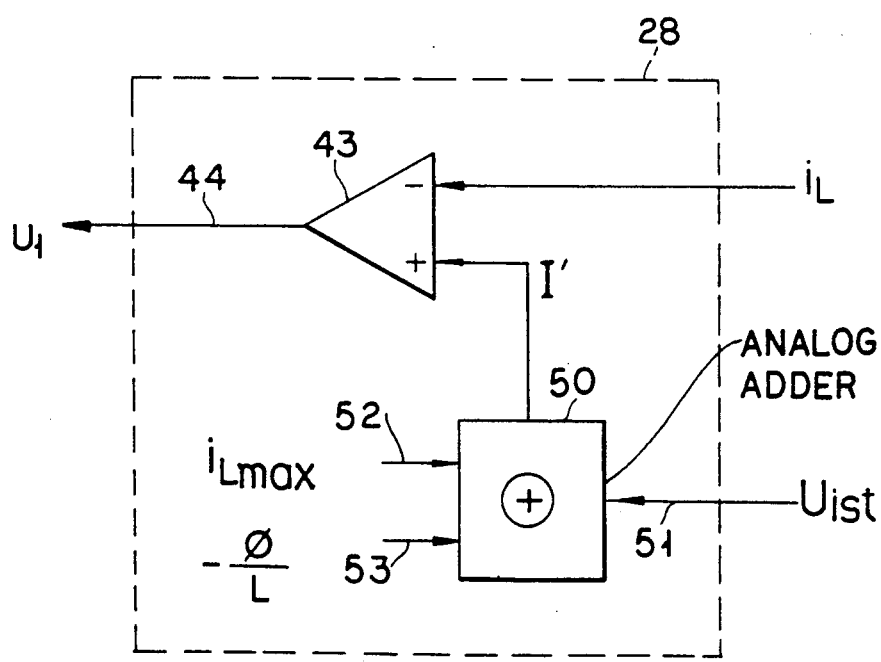
FIG. 6 is a further circuit diagram of a control circuit unit.

FIG. 6 shows a further circuit diagram of emergency control unit 28, which corresponds to expression (4). In this version of emergency control unit 28, units 37 and 40 of FIG. 3 are reduced to one analog adder 50. Fed to the latter via input 51 is the variable output voltage $U_{ist}$ and via inputs 52, 53, the constants $i_{Lmax}$ and $$\frac{-\phi}{L}.$$

The output signal I' of analog adder 50 is, as FIG. 3 shows, compared by means of a comparator 43 to current $i_L$. As soon as I' exceeds $i_L$, voltage $u_1$ at output 44 surpasses voltage $u_2$ at output 30 of controller 27, at which point emergency control unit 28 intervenes via the priority loop 31 to govern switching regulator 11.

The described method for preventing transients from damaging switching regulator (11) is simple and is embodied as described in the manner of a predictive controller. Such an arrangement permits swift reaction to very short transients and operation in the presence of perturbations of longer duration, such as short circuits that occur at the output terminal. The switching arrangements required by the proposed method, in particular those described in FIG. 6, are quite simple and can be constructed from commercially-available electronic components.

While the foregoing description and drawings represent the preferred embodiments of the present invention, it will be obvious to those skilled in the art that various changes and modifications may be made therein without departing from the true spirit and scope of the present invention.

What is claimed is:

1. A method for preventing transients from damaging a switching regulator, which includes at least a switch, a recovery diode, a choke and a capacitor, comprising the steps of: providing a switch control that actuates said switch throughout a continuous series of period intervals (T) of variable length for switch-on interval (t) in each of said period intervals that is virtually constant, and determining prior to the beginning of each switch-on interval (t) whether or not the current flowing through the choke will surpass a predetermined maximum value ($i_{max}$), and in the event of such excess, holding the switch open until, at the end of the finally initiated switch-on interval (t), maximum current ($i_{max}$) is reached but not exceeded.

2. A method for preventing transients from damaging a switching regulator, which includes at least a switch, a recovery diode, a choke and a capacitor, comprising the steps of: providing a switch control that actuates said switch throughout a continuous series of period intervals (T) of variable length for switch-on interval (t) in each of said period intervals that is virtually constant, and determining prior to the beginning of each switch-on interval (t) whether or not the current flowing through the choke will surpass a predetermined maximum value ($i_{max}$), and in the event of each excess, holding the switch open until, at the end of the finally initiated switch-on interval (t), maximum current ($i_{max}$) is reached but not exceeded, and wherein the step for determining the anticipated exceeding of the predetermined maximum current ($i_{max}$) is derived from a combination of the prevalent actual values of the input voltage (e), output voltage ($U_{ist}$) and current ($i_L$) through said choke.

3. A method in accordance with claim 2, wherein said combination comprises the expression (input voltage (e)—output voltage ($U_{ist}$))/input voltage (e).

4. A method for preventing transients from damaging a switching regulator, which includes at least a switch, a recovery diode, a choke and a capacitor, comprising the steps of: providing a switch control that actuates said switch throughout a continuous series of period intervals (T) of variable length for switch-on interval (t) in each of said period intervals that is virtually constant, and determining prior to the beginning of each switch-on interval (t) whether or not the current flowing through the choke will surpass a predetermined maximum value ($i_{max}$), and in the event of each excess, holding the switch open until, at the end of the finally initiated switch-on interval (t), maximum current ($i_{max}$) is reached but not exceeded, and wherein said anticipated exceeding of a predetermined maximum current ($i_{max}$) is calculated from a combination of the prevalent actual value of output voltage ($U_{ist}$) and current ($i_L$) through said choke.

5. A circuit arrangement for preventing transients from damaging a switching regulator which includes at least a switch, a recovery diode, a choke, a capacitor and a switch control for said switch, said switch control including:

a monostable multivibrator whose switch-on interval (t) is inversely proportional to an input voltage (e);

a voltage/frequency converter suitable for sending switch-on signals to said multivibrator;

a priority loop suitable for releasing the greater of any one of two given inputs voltages ($u_1$, $u_2$) to said voltage/frequency converter;

a controller capable of generating one of said input voltages to said priority loop by comparing prevalent actual voltage ($U_{ist}$) to a reference voltage ($U_{soll}$); and an emergency control unit suitable for generating the other of said input voltages ($u_1$) to said priority loop.

6. The circuitry arrangement in accordance with claim 5, wherein said emergency control unit comprises an adder/subtractor, a multiplier/divider and a comparator, and thereby is able to generate an output signal (I) from said input voltage (e) and output voltage ($U_{ist}$), said output signal constituting, as opposed to current value ($i_L$) at the output of choke, the other of said input voltages ($u_1$).

7. The circuitry arrangement in accordance with claim 5, wherein said emergency control unit comprises an analog adder and a comparator which permit output voltage ($U_{ist}$) to be formed as an output signal (I'), which, in comparison to current value ($i_L$) at the output of said choke, forms the other input voltage ($u_1$).

* * * * *